(12) United States Patent
Schulz et al.

(10) Patent No.: US 7,679,309 B2
(45) Date of Patent: Mar. 16, 2010

(54) METHOD AND SYSTEM FOR MOTOR CONTROL WITH DELAY COMPENSATION

(75) Inventors: Steven E. Schulz, Torrance, CA (US); Nitinkumar R. Patel, Cypress, CA (US); Bonho Bae, Torrance, CA (US); Stephen T. West, New Palestine, IN (US)

(73) Assignee: GM Global Technologies Operations, Inc., Detroit, MI (US)

( * ) Notice: Subject to any disclaimer, the term of this patent is extended or adjusted under 35 U.S.C. 154(b) by 376 days.

(21) Appl. No.: 11/743,718

(22) Filed: May 3, 2007

(65) Prior Publication Data

US 2008/0272732 A1 Nov. 6, 2008

(51) Int. Cl.
*H02P 23/00* (2006.01)
(52) U.S. Cl. .................... 318/811; 318/432; 318/599
(58) Field of Classification Search ............ 318/811, 318/432, 599, 606, 632, 809, 812, 608, 636
See application file for complete search history.

(56) References Cited

U.S. PATENT DOCUMENTS

| | | | | |
|---|---|---|---|---|
| 5,726,545 A | * | 3/1998 | Iwashita et al. | 318/432 |
| 2002/0154110 A1 | * | 10/2002 | Anzai et al. | 345/211 |
| 2004/0095789 A1 | * | 5/2004 | Li et al. | 363/132 |

* cited by examiner

*Primary Examiner*—Karen Masih
(74) *Attorney, Agent, or Firm*—Ingrassia Fisher & Lorenz, P.C.

(57) ABSTRACT

Methods and systems are provided for controlling an electric machine via an inverter while compensating for one or more hardware delays. The method includes receiving a control signal, producing a first sampling signal based on the control signal, and adjusting the sampling signal to compensate for a first delay of the one or more hardware delays. The inverter is operable to produce a voltage signal based on the control signal, and the electric machine is operable to produce a current based on the voltage signal. A sampling of the current is performed based on the first sampling signal.

20 Claims, 3 Drawing Sheets

METHOD AND SYSTEM FOR MOTOR CONTROL WITH DELAY COMPENSATION

TECHNICAL FIELD

The present invention generally relates to controlling motors, and more particularly relates to systems and methods for compensating for delays in electric motor drive systems.

BACKGROUND OF THE INVENTION

The fundamental frequency of an electric motor generally increases with a greater pole count of the electric motor. Real hardware delays, which may be ignored in lower fundamental frequency applications, become significant in electric motors having a greater pole count, and these delays may undesirably affect control performance absent compensation. While the fundamental frequency is generally increased for these electric motors, the switching frequency, as well as sampling frequency, typically remains substantially constant. For example, processor throughput and switching loss limitations predominantly affect the switching and sampling frequencies.

One indication of motor control capability is a pulse ratio, which may be determined from a ratio of the switching frequency to the fundamental frequency for the electric motor. The electric motor drive system is generally designed with a maximum possible pulse ratio. In electric motors with a greater pole count, the pulse ratio is typically reduced and can interfere with motor control and increase sensitivity to delays.

Accordingly, it is desirable to provide a method and apparatus for electric motor control that minimizes the effects of hardware delays. In addition, it is desirable to provide a method and apparatus for electric motor control that compensates for hardware delays. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and systems are provided for controlling a voltage source inverter with compensation for hardware delays that improves controllability and stability at high motor speeds and low pulse ratios. In an exemplary embodiment, a method for controlling an electric machine via an inverter is provided. The electric machine has one or more hardware components of a type configured to introduce one or more delays. The method includes receiving a control signal, producing a sampling signal based on the control signal, and adjusting the sampling signal to compensate for a first delay of the one or more delays. The inverter is operable to produce a voltage signal based on the control signal, and the electric machine is operable to produce a current based on the voltage signal. A sampling of the current is performed based on the sampling signal.

In another exemplary embodiment, a system for controlling an electric machine is provided. The electric machine has one or more hardware components of a type configured to introduce one or more delays. The system includes an inverter configured to produce an output signal in response to a control signal, an analog-to-digital converter configured to sample a current in response to a sampling signal, and a controller having an input coupled to the analog-to-digital converter and having an output coupled to the inverter. The output signal represents a voltage provided to the electric machine, and the electric machine is operable to produce the current based on the voltage. The controller is configured to produce the sampling signal and the control signal and adjust the sampling signal to compensate for a first delay of the one or more delays. The control signal is based on the current sampled by the analog-to-digital converter.

In another exemplary embodiment, a method is provided for controlling an electric machine via an inverter. The inverter is operable to produce an output signal, and the electric machine is operable to produce a current based on the output signal and has one or more hardware components of a type configured to introduce one or more delays. The method includes receiving a control signal, producing a sampling signal based on the control signal, scheduling a sampling of the current based on the sampling signal, and adjusting the sampling of the current and the sampling signal to compensate for a first delay of the one or more delays. The inverter has a dead-time and is operable to produce the output signal based on the control signal. The output signal has the first delay, and the first delay is based on the dead-time.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Methods and systems are provided for controlling an electric machine via an inverter. Control of the electric machine may be based on one or more different operating variables and is typically based on at least one of a voltage signal supplied by the inverter to the electric machine, a current produced by the electric machine in response to the voltage signal, a rotor position of the electric machine, and a transformation angle (e.g., for transforming a stationary frame AC current to a stationary frame DC current). The system for controlling the electric machine may have one or more hardware components that introduce a delay(s) in the operating variable(s) used for controlling the operation of the electric machine. The term "hardware component," or simply "hardware," refers to a physical device of the electric machine. Examples of hardware components include, but are not necessarily limited to, analog filters, sensors (e.g., current sensors), analog-to-digital converters (e.g., a current sense analog-to-digital converter or a resolver-to-digital converter), or the like. In an exemplary embodiment, the control of the electric machine compensates for one or more of the delays introduced by one or more of the hardware components of the control system.

Figure 1:
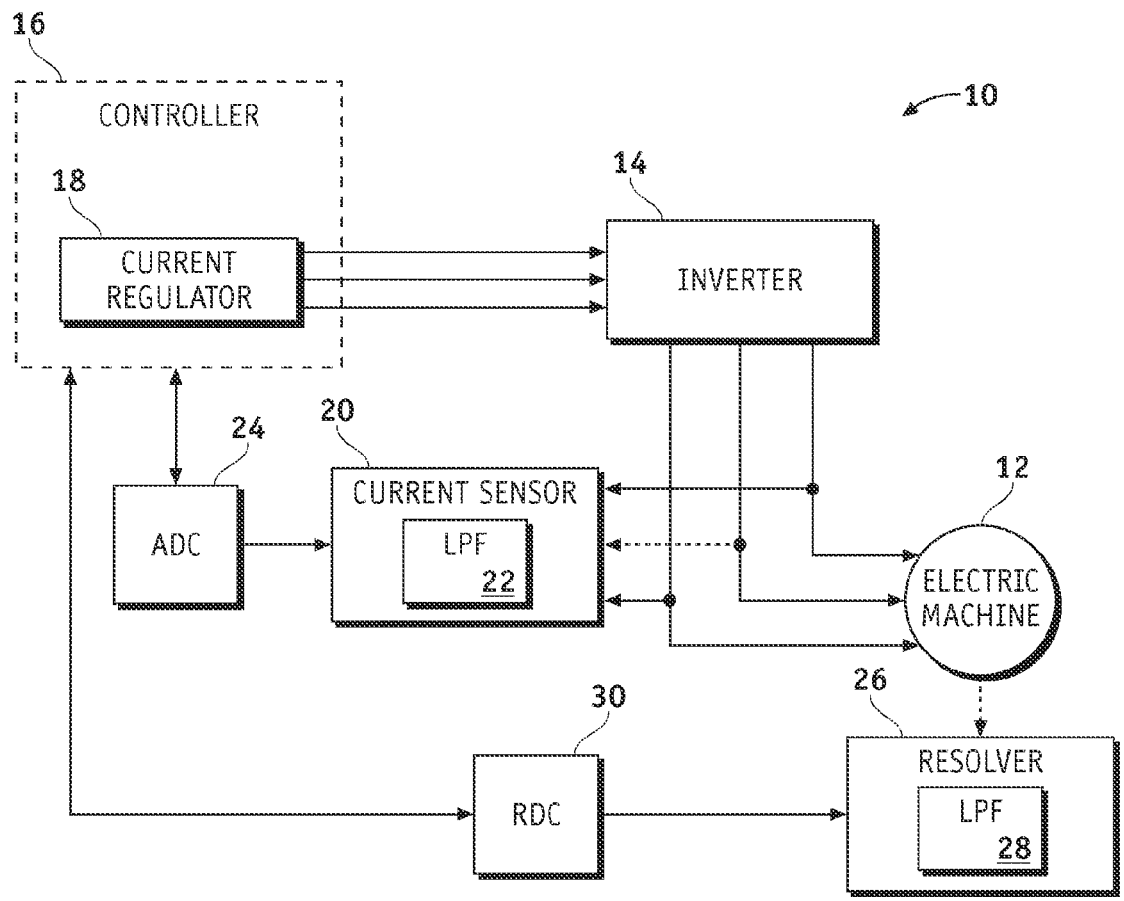
FIG. 1 is a block diagram of a control system and an electric machine in accordance with an exemplary embodiment.

Referring to FIG. 1, a control system 10 and an electric machine 12 are shown in accordance with an exemplary embodiment of the present invention. The control system 10 comprises a controller 16, an inverter 14 having an input coupled to an output of the controller 16, and the electric machine 12 coupled to an output of the inverter 14. The control system 10 may be implemented for vehicle applications (e.g., electric vehicles, hybrid vehicles, or the like) or other propulsion, power generating, or motoring applications based on electric machines. In one embodiment, the electric machine 12 may be any conventional electric motor commonly used in automotive vehicles. For example, the electric machine 12 is a three-phase electric motor having a phase winding for each of the phases.

Although the controller 16 and inverter 14 are shown and described as separate components of the control system 10, the controller 16 and inverter 14 may be combined into a single unit (e.g., the controller 16 may be a component of the inverter 14 and vice versa). The controller 16 transmits a control signal to the inverter 14, and the inverter 14 produces a voltage signal (e.g., representing phase voltages produced by the inverter 14) based on the control signal. The inverter 14 provides the voltage signal to the electric machine 12 to drive the electric machine, and the electric machine produces a current (e.g., phase currents) based on the voltage signal. Other signals (e.g., timing signals or the like) may also be produced by the controller to regulate the operation of various components of the control system 10.

It will be appreciated that exemplary embodiments described herein may comprise one or more conventional processors and stored program instructions that control the one or more processors to implement, in conjunction with certain non-processor circuits (e.g., switching circuits), some, most, or all of the functions for controlling/modifying signals produced by or received by the controller 16 as described herein. As such, these functions may be interpreted as steps of a method for controlling an electric machine. Alternatively, some or all functions could be implemented by a state machine that lacks stored program instructions, or in one or more application specific integrated circuits (ASICs), in which each function or some combinations of certain of the functions are implemented as custom logic. Additionally, a combination of the two approaches could be used.

To control the electric machine 12, in an exemplary embodiment, the controller 16 produces a pulse width modulation (PWM) signal for controlling the switching of the inverter 14. For example, the controller 16 generates three (3) PWM signals, each of the PWM signals corresponding to a different phase of a three-phase electric machine. One or more of the components of the controller 16 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof. Additionally, in vehicle applications, the controller 16 may be incorporated into an electronic control module. In one embodiment, the controller 16 implements one or more control algorithms that may optimize the operation of the electric machine 12 under a variety of operating conditions.

In this exemplary embodiment, the inverter 14 is preferably a voltage source inverter which produces phase voltages based on the PWM signals from a supply potential (e.g., a battery potential or a DC bus voltage supplied by a positive DC bus and a negative DC bus) and drives the electric machine 12 with the phase voltages. For example, the inverter 14 converts the PWM signal to a modulated voltage waveform. The phase voltages produced by the inverter 14 each correspond to a respective phase winding of the three-phase electric machine. In one embodiment, the inverter 14 comprises a switch network (not shown) that receives the PWM signals from the controller 16. The switch network comprises three pairs of series switches (e.g., transistor type switches, such as insulated gate bipolar transistors (IGBTs), or the like) with anti-parallel diodes corresponding to each of the phases. Each of the pairs of series switches comprises a first switch having a first terminal coupled to the positive electrode of a power source (not shown) and a second switch having a first terminal coupled to the negative electrode of the power source. For each of the pairs of series switches, the second switch has a second terminal coupled to a second terminal of the first switch, respectively, and the second terminals for each of the pairs of series switches are coupled to a corresponding phase winding of the electric machine 12.

In addition to producing the phase voltages, the inverter 14 can vary the magnitude of phase voltages applied to the electric machine 12, thus allowing the controller 16 to regulate the phase currents produced by the electric machine 12. The controller monitors the different operating variables to vary the magnitude of the phase voltages produced by the inverter 14. In one embodiment, the controller 16 comprises a current regulator 18 that produces the PWM signals based on at least one of the current produced by the electric machine 12 (e.g., based on the voltage signals), the rotor position of the electric machine 12, and a transformation angle.

The control system 10 may additionally comprise a resolver 26 coupled to the electric machine 12 for sensing a rotor position of the electric machine 12 and a current sensor 20 for measuring the current produced by the electric machine. A resolver-to-digital converter (RDC) 30 may be coupled to the resolver 26 to provide a digital position signal to the controller 16, and a current sense analog-to-digital (A-to-D) converter 24 may be coupled to the current sensor 20 to provide a digital current signal to the controller 16. For example, the RDC 30 has an input coupled to an output of the resolver 26 and has an output coupled to a first input of the controller 16, and the current sense A-to-D converter 24 has an input coupled to an output of the current sensor 20 and has an output coupled to a second input of the controller 16. The RDC 30 samples the output of the resolver 26 and the current sense A-to-D converter 24 samples the output of the current sensor 20 based on an A-to-D trigger signal from the controller 16.

Figures 2, 3:
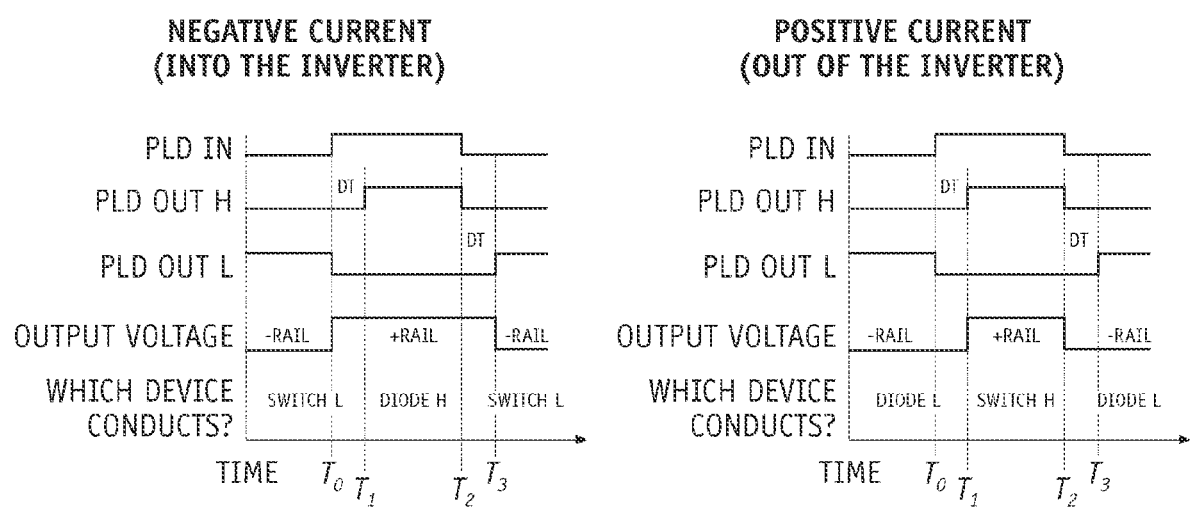
FIGS. 2 and 3 are waveforms illustrating the relation between control signals, switching signals, and a voltage signal useful in understanding the inverter shown in FIG. 1.

FIGS. 2 and 3 are waveforms illustrating the relation between a control signal (PLD In), switching signals (PLD Out H, PLD Out L), and a voltage signal (Output voltage) useful in understanding the inverter 14 shown in FIG. 1. Voltage source inverters typically have an inverter dead-time that introduces a delay in an output voltage pulse of one-half of the dead-time period ($t_{Dead}$). Referring to FIGS. 1-3, in one embodiment, the three (3) PWM signals generated by the controller 16 are supplied to a programmable logic device (PLD) (not shown). For example, the PLD receives a PWM signal (PLD In) having a period with a starting time ($T_0$) (e.g., at a rising edge of the PWM signal). The PLD inserts the inverter dead-time into each of the PWM signals and creates complementary signals (PLD Out H and PLD Out L) for the first switches of the pairs of series switches and the second switches of the pairs of series switches (e.g., the upper and lower IGBTs of the inverter 14). For example, the PLD creates a first complementary signal (PLS Out H) for the upper IGBTs (Switch H) and a second complementary signal (PLS Out L) for the lower IBGTs (Switch L). Three independent sets of these signals are generated by the PLD, one set for each inverter phase. The rising edge of the complementary signals are delayed by the PLD by $t_{dead}$ (DT). For example, the rising edge of the first complementary signal (PLD Out H) is delayed from the starting time ($T_0$) to a first time ($T_1$), and the rising edge of the second complementary signal (PLD Out L) is delayed from a second time ($T_2$) to a third time ($T_3$).

The actual output voltage of the inverter 14 applied to the electric machine 12 during the dead-time is a function of a load current polarity. Referring to FIGS. 1 and 2, current (e.g., a negative current) is directed into the inverter 14, which occurs during alternating half-cycles of the AC current flowing into the electric machine 12, for example. Referring to FIGS. 1 and 3, current (e.g., a positive current) is directed out of the inverter 14, which occurs during alternating half-cycles of the AC current flowing into the electric machine 12, for example. For a negative current, an upper diode (Diode H) (e.g., one of the anti-parallel diodes associated with the upper IGBTs of the inverter 14) conducts during the dead-time, and this clamps the output voltage of the inverter 14 to the positive DC bus (+Rail) (e.g., between $T_0$ and $T_1$ and between $T_2$ and $T_3$). For a positive current, a lower diode (Diode L) (e.g., one of the anti-parallel diodes associated with the lower IGBTs of the inverter 14) conducts during the dead-time, and this clamps the output voltage of the inverter 14 to the negative DC bus (−Rail) (e.g., between $T_0$ and $T_1$ and between $T_2$ and $T_3$). In both cases, the center of the effective output voltage pulse is delayed by about one-half of the dead-time period in comparison with the control signal (PLD In).

In one embodiment, the sampling instant of the current produced by the electric machine 12 is preferably aligned with the actual output voltage of the inverter 14. For example, the current is typically sampled at the start of the PWM period, which is the center of the IGBT "off" time or "on" time. To compensate for the delay introduced by the dead-time, the sampling of the current is delayed from the start of the PWM period by about $0.5 * t_{Dead}$. The A-to-D trigger instant may be advanced (e.g., via software as part of a control algorithm executed by the controller 16) with respect to the start (e.g., the rising edge) of the PWM period. In one embodiment, the controller operates with an A-to-D conversion queue having a conversion time ($t_{AD\_Conv}$) associated with each of the positions in the A-to-D conversion queue. For example, the sampling of the current may be scheduled for a first position of the A-to-D conversion queue. By advancing the A-to-D trigger instant (e.g., by advancing the A-to-D trigger signal), the sampling of the current can be shifted into a second position of the A-to-D conversion queue (e.g., $K_{Queue}=2$, where $K_{Queue}$ is the current sensing position in the A-to-D conversion queue), which effectively delays the sampling of the current by one A-to-D conversion time ($t_{AD\_Conv}$). The A-to-D trigger instant can then be advanced to align the sampling of the current with the actual output voltage of the inverter 14.

Figure 4:
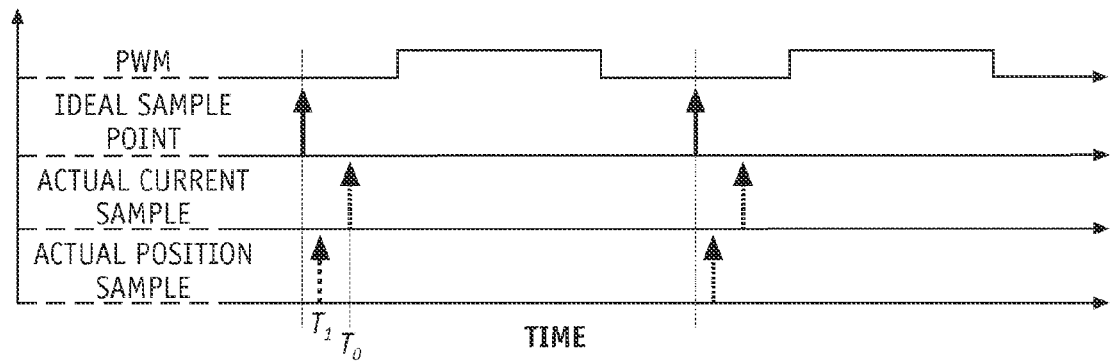
FIGS. 4-6 are waveforms illustrating the relation between a control signal and current and position samplings useful in understanding a sampling delay compensation in accordance with an exemplary embodiment.
Figure 5:
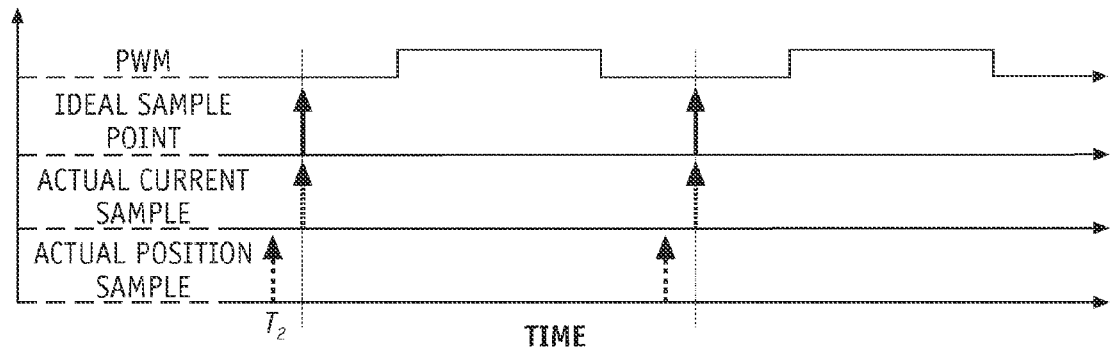
Figure 6:
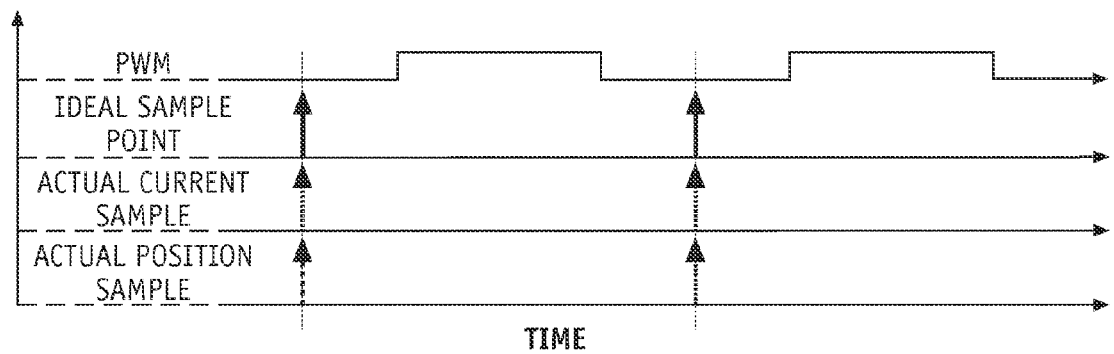

FIGS. 4-6 are waveforms illustrating the relation between a control signal (PWM) and current and position samplings (Actual Current Sample and Actual Position Sample) useful in understanding a sampling delay compensation in accordance with an exemplary embodiment. The current sampling and position sampling are preferably latched simultaneously and sampled at about the start of the PWM cycle (Ideal Sample Point). Each of the current sampling and position sampling may have a slightly different delay between the A-to-D trigger instant and the sampling instants associated with the current sampling and position sampling, respectively. For example, referring to FIGS. 1 and 4, the RDC 30 has a sample-and-hold (S&H), or data latch, time ($t_{Res\_S\&H}$) and the current sense A-to-D converter 24 has an S&H time ($t_{AD\_S\&H}$) that is generally longer than the RDC data latch time ($t_{Res\_S\&H}$). The result is that the Actual Current Sample occurs at a first time $T_0$ and the Actual Position Sample occurs at a second time $T_1$ prior to $T_0$, as shown in FIG. 4.

Referring to FIG. 5, the A-to-D trigger instant is advanced by the A-to-D S&H time (e.g., the A-to-D trigger may be advance by the A-to-D S&H time via software executed by the controller 16 shown in FIG. 1) to compensate for this disparity. The current sampling (Actual Current Sample) is aligned with the start of the PWM cycle (Ideal Sample Point). In one embodiment, the A-to-D trigger instant is advanced by the A-to-D S&H time in addition to other advancements of the A-to-D trigger instant (e.g., advancements introduced to compensate for the inverter dead-time). However, the position sampling (Actual Position Sample) is also advanced to a third time $T_2$ with respect to the current sampling due to the different S&H times.

Referring FIG. 6, the rotor position signal is adjusted (e.g., via software executed by the controller 16 shown in FIG. 1) to delay the position sampling by an amount $t_{AD\_S\&H}-t_{Res\_S\&H}$ to properly align the position sampling with the current sampling. The adjusted rotor position signal results in an Effective Position Sample that is aligned with the Actual Current Sample and the Ideal Sample Point.

Referring to FIG. 1, in addition to the delays associated with the current sense A-to-D converter 24 and the RDC 30, the use of one or more analog filters for filtering noise from various signals may introduce additional delay(s). For example, the resolver 26 is typically mounted on the motor shaft in relatively close proximity to the stator winding end turns. In this configuration, the resolver 26 may be exposed to an airgap between the motor rotor and the stator. Additionally, signal wires can extend along significant distances between the electric machine 12 and the RDC 30 (e.g., a microchip on a controller board) and thus, feedback sin/cos signals for the resolver 26 may be susceptible to noise. An analog filter 28 (e.g., such as a low pass filter based on a resistor-capacitor circuit) may be employed to filter out this noise from the signals but may introduce a differential phase lag in the feedback sin/cos signals for the resolver 26. This phase lag can translate into an effective delay in the position sampling (e.g., the analog position signal output by the resolver 26).

The effective delay introduced by the analog filter 28 is approximately linear with respect to frequency and can be modeled by a fixed time delay ($t_{Res\_RC\_Delay}$) in the position sampling. In one embodiment, the rotor position signal can be advanced (e.g., via software) by an amount appropriate to compensate for this delay, $t_{Res\_RC\_Delay}$. Additionally, this compensation may be aggregated with the position compensation (e.g., $t_{AD\_S\&H}-t_{Res\_S\&H}$) described with respect to FIGS. 4-6.

Including the inverter dead-time and current sampling delays, a total advance for the A-to-D trigger signal can be determined. The A-to-D trigger signal is advanced by a time, $t_{Trig\_Adv}$, with respect to the PWM output pulses as follows:

$$t_{Trig\_Adv} = (K_{Queue} - 1) \cdot t_{AD\_Conv} + t_{AD\_S\&H} - \frac{t_{Dead}}{2}. \quad (eq. 1)$$

The position sampling can then be correctly aligned with the current sampling, including the effects of the position sampling delay and the resolver sin/cos analog filtering. In one embodiment, the sampled position is corrected within a software algorithm using the position sampling time delay which is determined as follows:

$$t_{Pos\_Sample\_Delay} = (K_{Queue} - 1) \cdot t_{AD\_Conv} + t_{AD\_S\&H} - t_{Res\_S\&H} + t_{Res\_RC\_Delay} \quad (eq. 2).$$

A position correction ($\Delta\theta_{Adj}$) is then determined from the position sampling time delay as follows:

$$\Delta\theta_{Adj} = t_{Pos\_Sample\_Delay} \cdot \omega_e \quad (eq. 3),$$

where $\omega_e$ is the motor electrical frequency of the electric machine 12. These adjustments align the current and position sampling to compensate for the delays associated with the inverter dead-time, the S&H time of the current sense A-to-D converter 24, the data latch time of the RDC 30, and the phase lag of the analog filter 28.

Figure 7:
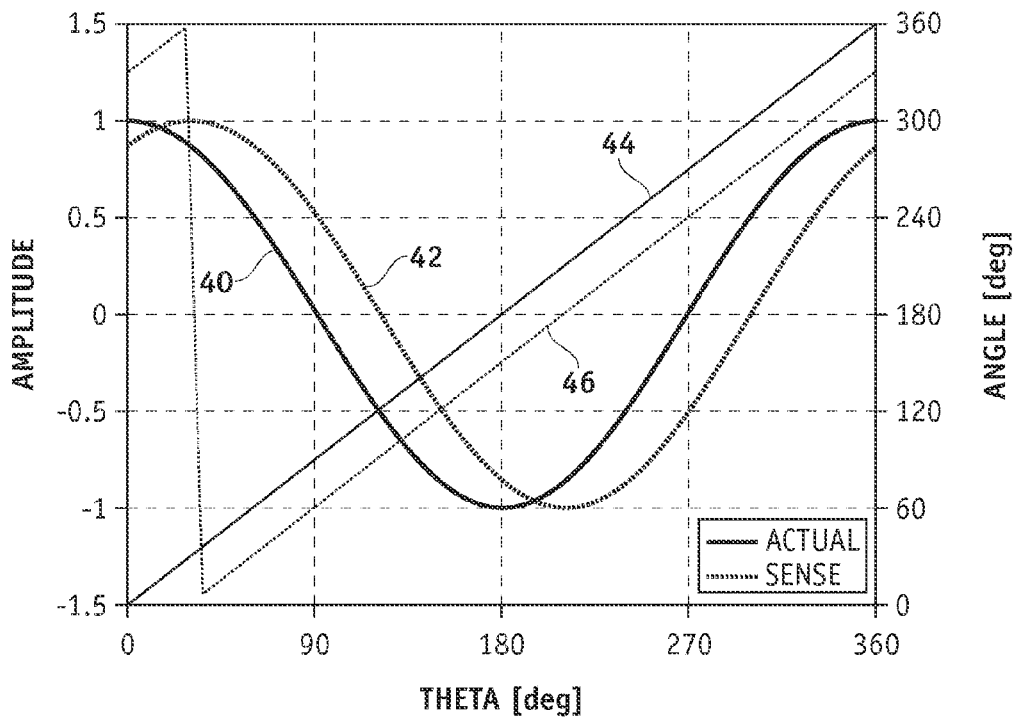
FIG. 7 are waveforms illustrating the relation between phase currents and rotor positions useful in understanding a transformation angle compensation in accordance with an exemplary embodiment.

FIG. 7 are waveforms illustrating the relationship between phase currents 40, 42 and a rotor position 44 useful in understanding a transformation angle compensation in accordance with an exemplary embodiment. In one embodiment, the current sensor 20 has a finite bandwidth, and this can result in a sensed current delay, $t_{CS\_Sensor\_Delay}$, in the analog current signal output by the current sensor 20. Additionally, an analog filter 22 (e.g., a low pass filter based on a resistor-capacitor circuit) may be utilized to filter out noise from the analog current signal and provide anti-aliasing cut-off before passing to the current sense A-to-D converter 24. The analog filter 22 may introduce a delay in the analog current signal, represented by $t_{CS\_RC\_Delay}$. These two delays may be summed together for analysis and compensation.

The effect of these delays on a sampled phase current 42 is shown in FIG. 7. Referring to FIGS. 1 and 7, the sampled phase current 42 (e.g., sampled in software) lags an actual phase current 40 produced by the electric machine 12. An actual rotor position 44 has a fixed phase relation to the actual phase current 40. However, this phase relation is generally lost between the actual rotor position 44 and the sampled phase current 42. A transformation angle 46, which is used to transform stationary frame AC currents into synchronous frame DC quantities, can be adjusted to compensate for these delays and preserve the correct phase relation to the sampled phase current 42. Thus, the transformation angle 46 can provide the appropriate synchronous frame quantities. For example, the transformation angle is delayed by a time based on the sum of the sensed current delay and the delay associated with the analog filter 22, $t_{CS\_RC\_Delay} + t_{CS\_Sensor\_Delay}$.

Figure 8:
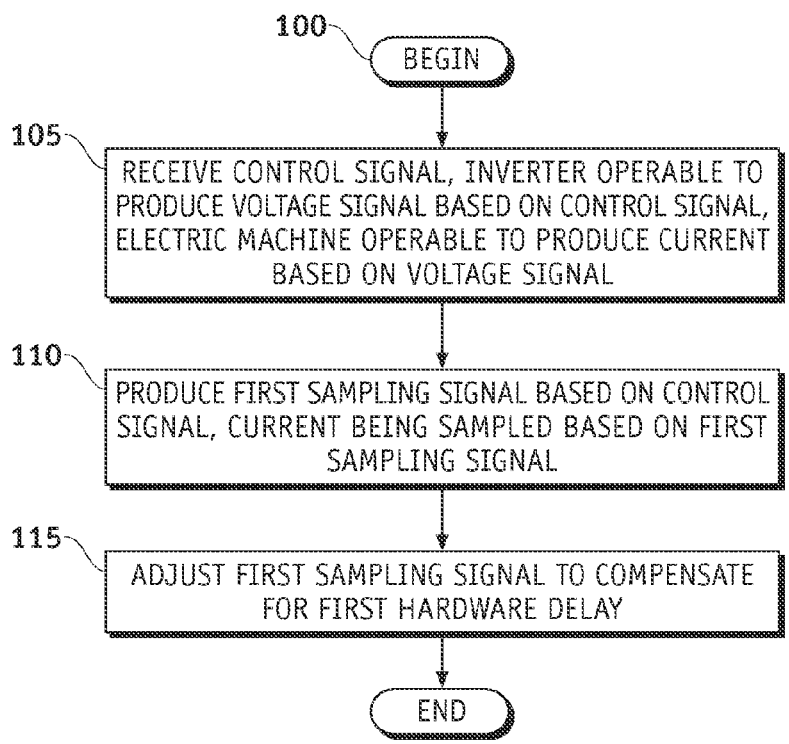
FIG. 8 is a flow diagram of a method for controlling an electric machine via an inverter in accordance with an exemplary embodiment.

FIG. 8 is flow diagram of a method 100 for controlling an electric machine via an inverter in accordance with an exemplary embodiment of the present invention. Referring to FIGS. 1 and 8, the inverter (e.g., the inverter 14) is operable to produce a voltage signal based on a control signal (e.g., from the controller 16), and the electric machine (e.g., the electric machine 12) is operable to produce a current (e.g., a phase current) based on the voltage signal. One or more hardware components of the control system 10 may introduce one or more delays. A control signal is received, as indicated at step 105. For example, the inverter 14 receives a PWM signal from the controller 16 and produces the voltage signal based on the PWM signal. A sampling signal is produced based on the control signal, as indicated at step 110. For example, the controller 16 produces an A-to-D trigger signal, and the current is sampled based on the A-to-D trigger signal (e.g., the current sense A-to-D converter 24 samples the phase current in response to the A-to-D trigger signal). The sampling signal is adjusted to compensate for a first delay of the one or more delays, as indicated at step 115.

In one embodiment, the inverter has a dead-time ($t_{Dead}$), and the PWM signal includes a first delay based on an inverter dead-time. The first sampling signal is delayed by a half of the inverter dead-time to compensate for the first delay. By delaying the first sampling signal by half of the inverter dead-time, the current sampling is aligned with the voltage signal (e.g., the current sampling instant is aligned with the actual voltage output by the inverter 14). In another embodiment, an analog-to-digital conversion of the current is performed (e.g., via the current sense A-to-D converter 24) in response to the sampling signal, and the analog-to-digital conversion has a conversion time (e.g., $t_{AD\_Conv}$). In this embodiment, the analog-to-digital conversion is delayed by the conversion time, and the sampling signal is advanced by a pre-determined time based on the conversion time and the voltage signal (e.g., the remaining difference in time between the corresponding actual voltage output and the current sampling instant as delayed by the conversion time). In another embodiment, the analog-to-digital conversion is scheduled for a first position in an analog-to-digital conversion queue. In this embodiment, the analog-to-digital conversion is advanced from the first position in the analog-to-digital conversion queue to a second position in the analog-to-digital conversion queue, the second position subsequent to the first position, and the sampling signal is advanced by the pre-determined time.

In another embodiment, a rotor position of the electric machine 12 is sampled in response to the sampling signal, and a position signal is produced therefrom. The position signal has a second delay. The first delay is associated with the current sampling, based on the first sampling signal, and is greater than the second delay. In this embodiment, the current sampling signal is adjusted to align with the position sampling signal. For example, the current sense A-to-D converter 24 has the S&H time ($t_{AD\_S\&H}$) and samples the phase current, produced by the electric machine 12, in response to the first sampling signal. The RDC 30 has the data latch time ($t_{Res\_S\&H}$) and produces a position signal in response to the second sampling signal. The position signal has the second delay based on the data latch time. The current sense A-to-D converter 24 and the RDC 30 are both triggered by the sampling signal, for example, the A-to-D trigger signal. In this example, the sampling signal is advanced by the A-to-D S&H time, and the position signal is delayed by a difference between the A-to-D S&H time and the RDC data latch time. Additionally, the sampling signal may be advanced by including the compensation for the inverter dead-time with the compensation for the disparity in the current sense A-to-D converter S&H time and the RDC data latch time. For example, the sampling signal is advanced by a time ($t_{Trig\_Adv}$), wherein $t_{Trig\_Adv} = (K_{Queue} - 1) \cdot t_{AD\_Conv} + t_{AD\_S\&H} - t_{Dead}/2$, and the position signal from the RDC 30 is delayed by $t_{AD\_S\&H} - t_{Res\_S\&H}$ to align the position sampling with the current sampling.

In another embodiment, the resolver 26 comprises the analog filter 28 to filter noise from the rotor position sensed by the resolver 26 to produce the position signal. The position signal has a phase lag based on the analog filter 28. In this embodiment, the second delay is determined based on the phase lag, a position correction is determined based on the second delay, and the position correction is added to the rotor position. Additionally, the position signal may be modified by including the compensation for the disparity in the current sense A-to-D converter S&H time and the RDC data latch time with the compensation for phase lag associated with the analog filter 28. For example, a position sample delay ($t_{Pos\_Sample\_Delay}$) is determined based on eq. 2, and a position correction ($\Delta\theta_{Adj}$), based on eq. 3, is added to the position signal from the RDC 30.

A transformation angle is typically used for transforming stationary frame AC currents to synchronous frame DC quantities. In one embodiment, the current sense A-to-D converter 24 samples a first current signal (e.g., the output of the current sensor 20) in response to the sampling signal. The current sensor 20 is operable to produce a second current signal representing the current (e.g., a raw current measurement) and has a finite bandwidth. The second current signal may have noise and a delay associated with on the finite bandwidth of the current sensor 20. The current sensor 20 may include the analog filter 22 to filter the noise from the second current signal to produce the first current signal. The first current signal may have another delay associated with the analog filter 22. In this embodiment, a combined delay is produced from a sum of the delay associated with the finite bandwidth of the current sensor 20 and the delay associated with the analog filter 22, an adjusted transformation angle is produced based on the transformation angle and the combined delay, and at least one synchronous frame current is determined based on the adjusted transformation angle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an electric machine via an inverter, the electric machine having one or more hardware components of a type configured to introduce one or more delays, the method comprising:
   receiving a pulse width modulation (PWM) signal, the inverter operable to produce a voltage signal based on the PWM signal, the voltage signal having a first delay of the one or more delays, the electric machine operable to produce a current based on the voltage signal;
   producing a sampling signal based on the PWM signal, a sampling of the current being performed in response to the sampling signal; and
   adjusting the sampling signal to compensate for the first delay, wherein adjusting the sampling signal comprises aligning the sampling of the current with the voltage signal.

2. A method according to claim 1, wherein the inverter has an inverter dead-time, the first delay being based on the inverter dead-time; and
   wherein the step of adjusting the sampling signal comprises delaying the sampling signal by a half of the inverter dead-time.

3. A method according to claim 1, wherein the inverter has an inverter dead-time, the first delay being based on the inverter dead-time, wherein an analog-to-digital conversion of the current is performed in response to the sampling signal, the analog-to-digital conversion having a conversion time, and wherein the step of adjusting the sampling signal comprises:
   delaying the analog-to-digital conversion by the conversion time; and
   advancing the sampling signal by a pre-determined time based on the conversion time and the voltage signal.

4. A method according to claim 1, wherein the inverter has an inverter dead-time, the first delay being based on the inverter dead-time, wherein an analog-to-digital conversion of the current is performed in response to the sampling signal, the analog-to-digital conversion having a conversion time and having a first position in an analog-to-digital conversion queue, and wherein the step of adjusting the sampling signal comprises:
   advancing the analog-to-digital conversion from the first position in the analog-to-digital conversion queue to a second position in the analog-to-digital conversion queue, the second position in the analog-to-digital conversion queue subsequent to the first position in the analog-to-digital conversion queue; and
   advancing the sampling signal by a pre-determined time based on the conversion time and the voltage signal.

5. A method according to claim 1, wherein a position sampling of a rotor position of the electric machine is performed in response to the sampling signal, the position sampling having a second delay of the one or more delays;
   wherein the first delay is greater than the second delay; and
   wherein the step of adjusting the sampling signal comprises aligning the sampling of the current with the position sampling.

6. A method according to claim 5, wherein an analog-to-digital converter is operable to sample the current in response to the sampling signal, the analog-to-digital converter having a sample-and-hold time, wherein a resolver-to-digital converter is operable to produce a position signal in response to the sampling signal, the resolver-to-digital converter having a data latch time, the position signal based on the data latch time and indicating the rotor position of the electric machine, and wherein the step of aligning the sampling of the current with the position sampling comprises:
   advancing the sampling signal by the sample-and-hold time; and
   delaying the position signal by a difference between the sample-and-hold time and the data latch time.

7. A method according to claim 5, wherein a resolver is operable to measure the rotor position of the electric machine in response to the sampling signal, the rotor position having a noise associated therewith, the resolver comprising an analog filter operable to filter the noise from the rotor position to produce a position signal, the position signal having a phase lag based on the analog filter, and wherein the step of aligning the sampling of the current with the position sampling comprises:
   determining the second delay based on the phase lag;
   determining a position correction based on the second delay; and
   adding the position correction to the rotor position.

8. A method according to claim 1, wherein the inverter is operable to produce the voltage signal based on the PWM signal and a transformation angle, wherein an analog-to-digital converter is operable to sample a first current signal in response to the sampling signal, wherein a current sensor is operable to produce a second current signal representing the current, the current sensor having a finite bandwidth, the second current signal comprising a noise and a second delay of the one or more delays the second delay based on the finite bandwidth, wherein an analog filter is operable to filter the noise from the second current signal to produce the first current signal, the second current signal comprising a third delay of the one or more delays, the third delay based on the analog filter, and wherein the method further comprises:

producing a combined delay from a sum of the third delay and the second delay;

producing an adjusted transformation angle based on the transformation angle and the combined delay; and determining at least one synchronous frame current based on the adjusted transformation angle.

9. A system for controlling an electric machine, the electric machine having one or more hardware components of a type configured to introduce one or more delays, the system comprising:

an inverter configured to produce an output signal in response to a control signal, the output signal representing a voltage provided to the electric machine, the output signal having a first delay of the one or more delays, the electric machine operable to produce a current based on the voltage;

an analog-to-digital converter configured to sample the current in response to a sampling signal; and a controller having an input coupled to the analog-to-digital converter and having an output coupled to the inverter, the controller configured to:

produce the sampling signal and the control signal, the control signal based on the current sampled by the analog-to-digital converter; and adjust the sampling signal to compensate for the first delay to align sampling the current by the analog-to-digital converter with the voltage provided to the electric machine.

10. A system according to claim 9, wherein the analog-to-digital converter has a conversion queue, wherein in response to the sampling signal, the analog-to-digital converter schedules a current sample in a first position of the conversion queue, wherein the inverter has an inverter dead-time, the output signal having the first delay based on the inverter dead-time, and wherein the controller is further configured to:

shift the current sample from the first position in the conversion queue to a second position in the conversion queue, the second position subsequent to the first position; and advance the sampling signal to align the output signal with the current sample.

11. A system according to claim 10, further comprising:

a resolver coupled to the electric machine and having an output, the resolver configured to produce an analog position signal, the analog position signal indicating a rotor position of the electric machine;

a resolver-to-digital converter coupled to the controller and having an input coupled to the output of the resolver, the resolver-to-digital converter configured to:

sample the analog position signal during a data latch time in response to the sampling signal; and produce a digital position signal based on the analog position signal;

wherein the analog-to-digital converter is further configured to sample the current during a sample-and-hold time in response to the sampling signal, the sample-and-hold time greater than the data latch time; and wherein the controller is further configured to:

advance the sampling signal by the sample-and-hold time; and delay the digital position signal by a difference between the sample-and-hold time and the data latch time, wherein the control signal is based on the current sampled by the analog-to-digital converter and the digital position signal.

12. A system according to claim 11, wherein the resolver comprises a first analog filter, the resolver being further configured to produce the analog position signal from a sensed position having a noise, the first analog filter operable to filter the noise from the sensed position;

wherein the resolver-to-digital converter is further configured to produce a sampled signal based on the analog position signal in response to the sampling signal, the sampled signal having a second delay of the one or more delays based on the first analog filter; and wherein the controller is further configured to add a position correction to the analog position signal to compensate for the second delay.

13. A system according to claim 12, wherein the sampling signal is advance by a time ($t_{Trig\_Adv}$), wherein $$t_{Trig\_Adv} = (K_{Queue} - 1) \cdot t_{AD\_Conv} + t_{AD\_S\&H} - \frac{t_{Dead}}{2},$$

$K_{Queue}$ is a current position in the conversion queue, $t_{AD\_Conv}$ is a conversion time of the analog-to-digital converter, $t_{AD\_S\&H}$ is the sample-and-hold time, and $t_{Dead}$ is the inverter dead-time; and wherein the position correction is based on a position sample delay ($t_{Pos\_Sample\_Delay}$) multiplied by a motor electrical frequency of the electric machine, wherein $$t_{Pos\_Sample\_Delay} = (K_{Queue}-1) \cdot t_{AD\_Conv} + t_{AD\_S\&H} - t_{Res\_S\&H} + t_{Res\_RC\_Delay}, t_{Res\_S\&H}$$

is the data latch time, and $t_{Res\_RC\_Delay}$ is the second delay.

14. A system according to claim 12, further comprising:

a current sensor operable to measure the current, the current sensor having a pre-determined bandwidth; and a second analog filter having an input coupled to the current sensor and having an output coupled to the analog-to-digital converter, the analog-to-digital converter further configured to produce a current signal based on the current measured by the current sensor, the current sensor and the second analog filter together introducing a third delay in the current signal;

wherein the controller is fUrther configured to:

transform a stationary frame alternating current (AC) current to a synchronous frame direct current (DC) value using a transformation angle, the stationary frame AC current based on the current signal; and delay the transformation angle by an angle based on the third delay.

15. A method for controlling an electric machine via an inverter, the inverter operable to produce an output signal, the electric machine operable to produce a current based on the output signal and having one or more hardware components of a type configured to introduce one or more delays, the method comprising:

receiving a control signal, the inverter having a dead-time and operable to produce the output signal based on the control signal, the output signal having a first delay of the one or more delays, the first delay based on the dead-time;

producing a sampling signal based on the control signal;

scheduling a sampling of the current based on the sampling signal;

adjusting the sampling of the current and the sampling signal to compensate for the first delay.

16. A method according to claim 15, wherein the scheduling step comprises scheduling an analog-to-digital conversion of the current in a first position of a conversion queue, the analog-to-digital conversion having a conversion time ($t_{AD\_Conv}$); and wherein the step of adjusting the sampling of the current comprises:

shifting the analog-to-digital conversion from the first position to a second position in the conversion queue, the second position subsequent to the first position; and advancing the sampling signal by a time ($t_{Trig\_Adv}$), wherein $$t_{Trig\_Adv} = (K_{Queue} - 1) \cdot t_{AD\_Conv} - t_{Dead}/2,$$

$K_{Queue}$ is a current position of the analog-to-digital conversion in the conversion queue, and $t_{Dead}$ is the dead-time.

17. A method according to claim 16, wherein a resolver-to-digital converter is operable, in response to the sampling signal, to perform a position sampling during a data latch time ($t_{Res\_S\&H}$) and produce a digital position signal based on the position sampling, the digital position signal indicating a rotor position of the electric machine;

wherein an analog-to-digital converter is operable, in response to the sampling signal, to sample the current during a sample-and-hold time ($t_{AD\_S\&H}$), the sample-and-hold time greater than the data latch time;

wherein the step of advancing the sampling signal comprises advancing the sampling signal by a time ($t_{Trig\_Adv}$), wherein $$t_{Trig\_Adv} = (K_{Queue} - 1) \cdot t_{AD\_Conv} + t_{AD\_S\&H} - t_{Dead}/2; \text{ and}$$

wherein the method further comprises delaying the digital position signal by $t_{AD\_S\&H} - t_{Res\_S\&H}$ to align the position sampling with the sampling of the current.

18. A method according to claim 17, wherein the electric machine has a motor electrical frequency (We), wherein a resolver is operable to produce an analog position signal representing the rotor position, the digital position signal based on the analog position signal, the resolver comprising a first analog filter operable to filter a noise from the analog position signal, the digital position signal having a second delay ($t_{Res\_RC\_Delay}$) of the one or more delays based on the first analog filter; and wherein the step of delaying the digital position signal comprises:

determining a position sample delay ($t_{Pos\_Sample\_Delay}$), wherein $$t_{Pos\_Sample\_Delay} = (K_{Queue} - 1) \cdot t_{AD\_Conv} + t_{AD\_S\&H} - t_{Res\_S\&H} - t_{Res\_RC\_Delay}; \text{ and}$$

adding a position correction ($\Delta\theta_{Adj}$) to the digital position signal, wherein $\Delta\theta_{Adj} = t_{Pos\_Sample\_Delay} \cdot \omega_e$.

19. A method according to claim 18, wherein a current sensor is operable to produce an analog current signal, the current sensor having a pre-determined bandwidth, wherein a second analog filter is operable to filter a second noise from the analog current signal, the analog-to-digital converter further configured to produce a digital current signal based on the analog current signal, the digital current signal having a current sensor delay ($t_{CS\_RC\_Delay}$) and a current sensor filter delay ($t_{CS\_Sensor\_Delay}$); and wherein the method further comprises delaying a transformation angle by an angle based on $t_{CS\_RC\_Delay} + t_{CS\_Sensor\_Delay}$.

20. The method of claim 15, wherein the sampling of the current is aligned with the output signal.

* * * * *